US009160927B2

(12) United States Patent
Kim

(10) Patent No.: US 9,160,927 B2
(45) Date of Patent: Oct. 13, 2015

(54) MOBILE TERMINAL AND CONTROLLING METHOD THEREOF

(71) Applicant: LG Electronics Inc., Seoul (KR)

(72) Inventor: Youngkeon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/098,826

(22) Filed: Dec. 6, 2013

(65) Prior Publication Data

US 2014/0160321 A1     Jun. 12, 2014

(30) Foreign Application Priority Data

Dec. 7, 2012   (KR) ........................ 10-2012-0141822

(51) Int. Cl.
*H04N 5/232* (2006.01)
*G11B 27/031* (2006.01)
*H04N 5/14* (2006.01)

(52) U.S. Cl.
CPC .......... *H04N 5/23293* (2013.01); *G11B 27/031* (2013.01); *H04N 5/144* (2013.01); *H04N 5/23212* (2013.01); *H04N 5/23216* (2013.01); *H04N 5/23245* (2013.01)

(58) Field of Classification Search
CPC .......... H04N 5/23293; H04N 5/23212; H04N 5/23245; H04N 5/144; H04N 5/23216; G11B 27/031
USPC .......................................... 348/239
See application file for complete search history.

(56) References Cited

U.S. PATENT DOCUMENTS

| 2007/0035635 A1* | 2/2007 | Misawa ............... 348/222.1 |
| 2007/0147690 A1* | 6/2007 | Ishiwata .............. 382/232 |
| 2008/0303954 A1* | 12/2008 | Haraguchi et al. ......... 348/699 |

* cited by examiner

*Primary Examiner* — Mekonnen Dagnew
(74) *Attorney, Agent, or Firm* — KED & Associates LLP

(57) ABSTRACT

A mobile terminal and controlling method thereof are disclosed. The present invention includes photographing a plurality of images consecutively, determining an unchangeable region having a variation equal to or smaller than a reference value and a changeable region having the variation greater than the reference value in each of a plurality of the photographed images using the variations among a plurality of the photographed images, and creating a moving image by merging an image generated from combining the changeable regions in a plurality of the photographed images with the unchangeable region. Accordingly, the present invention provides a user with a moving image created in a manner of analyzing a region having a considerable variation in a plurality of photos taken before and after a photographing timing point and using a photo at the photographing timing point and a result from editing the analyzed region separately.

24 Claims, 13 Drawing Sheets

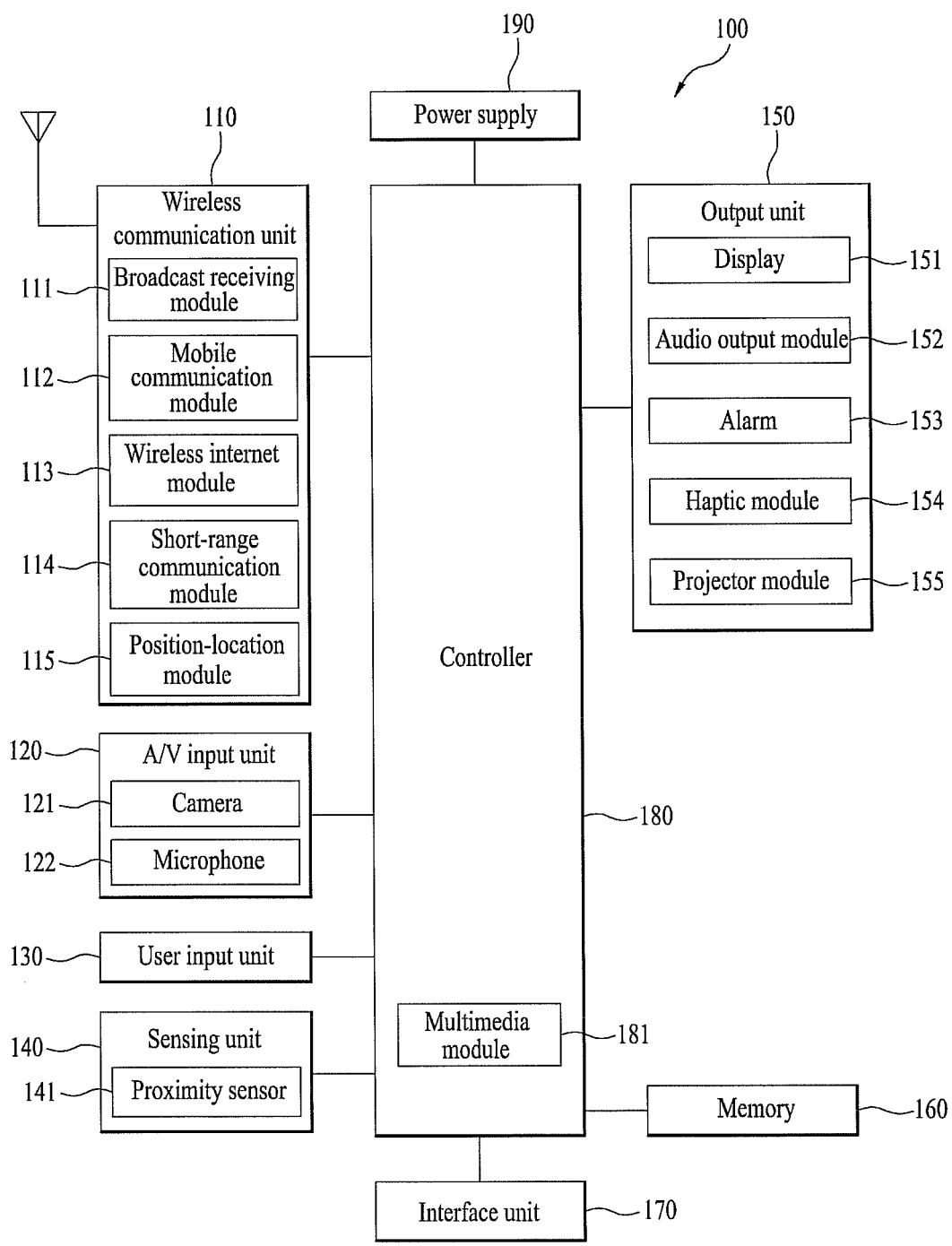

FIG. 5
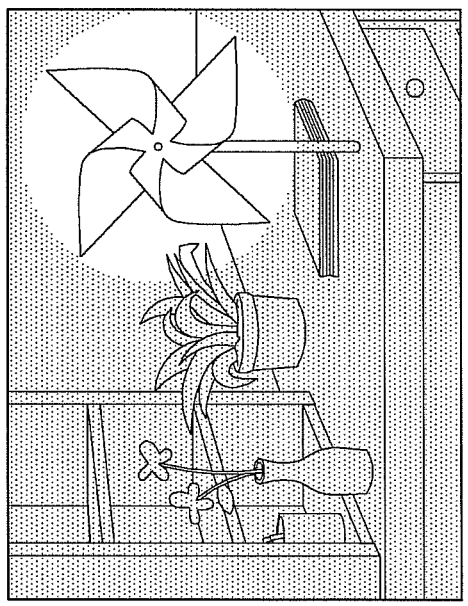
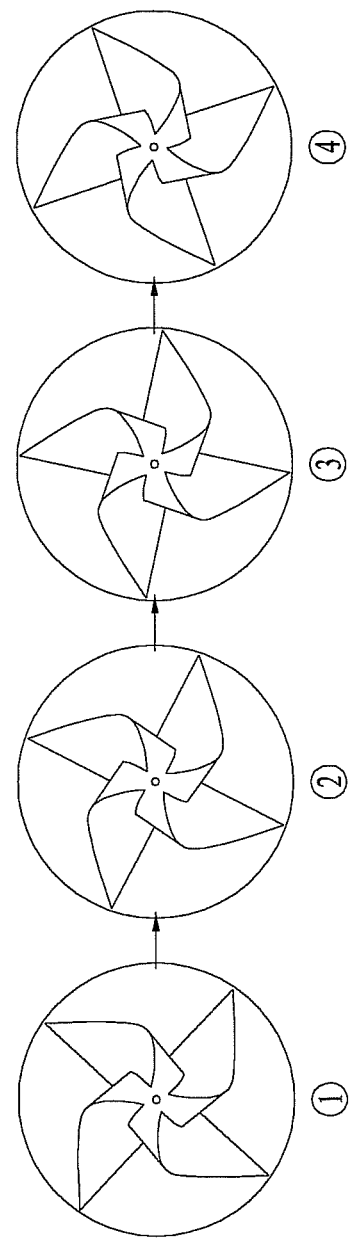

FIG. 13
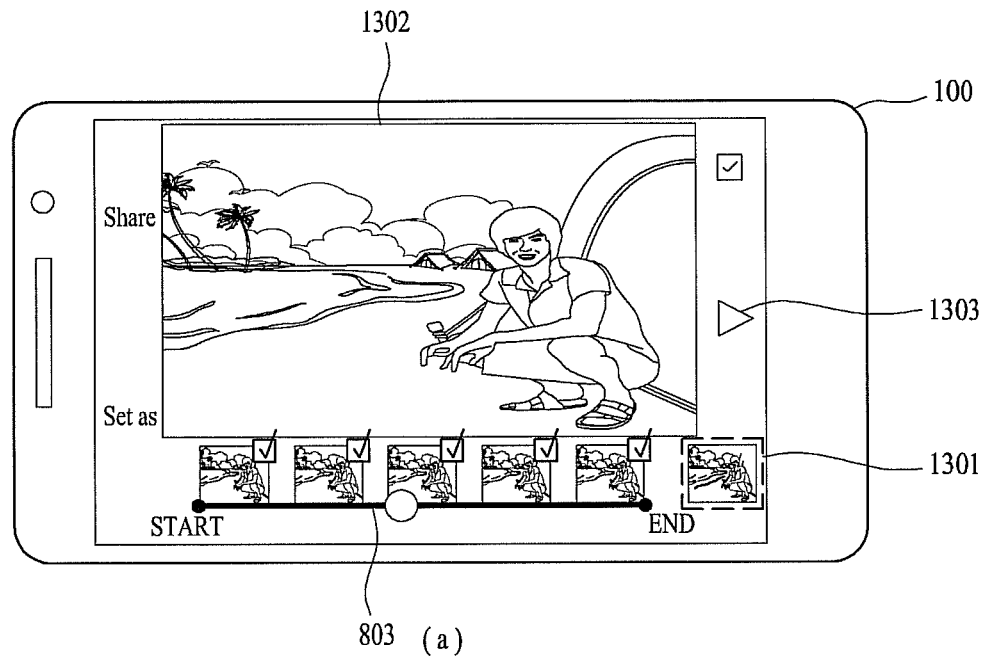
(a)
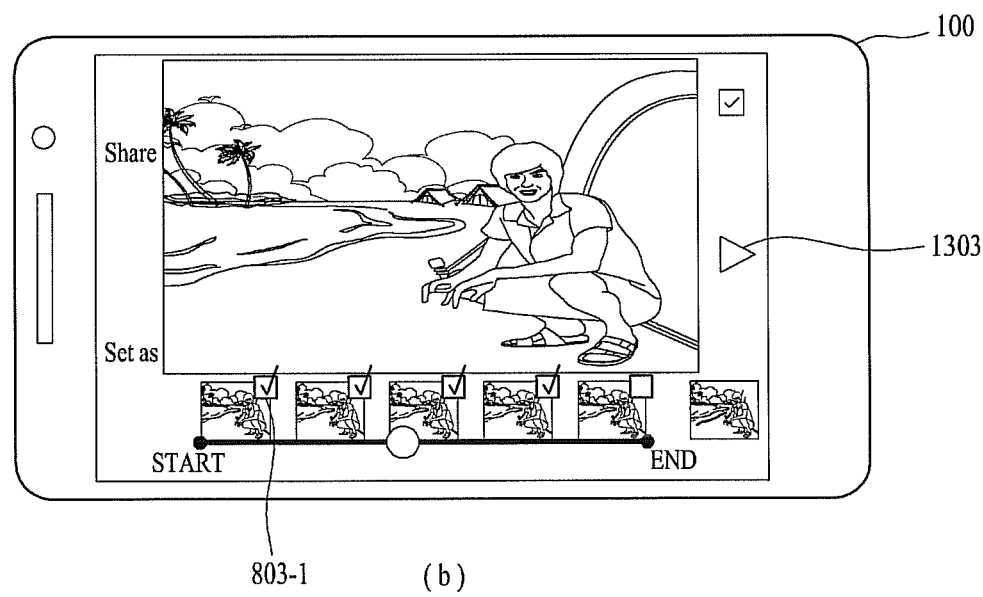
(b)

MOBILE TERMINAL AND CONTROLLING METHOD THEREOF

CROSS-REFERENCE TO RELATED APPLICATION(S)

Pursuant to 35 U.S.C. §119(a), this application claims the benefit of earlier filing date and right of priority to Korean Application No. 10-2012-0141822, filed on Dec. 7, 2012, the contents of which are hereby incorporated by reference herein in their entirety.

BACKGROUND

1. Field

The present invention relates to a mobile terminal, and more particularly, to a mobile terminal and controlling method thereof. Although the present invention is suitable for a wide scope of applications, it is particularly suitable for facilitating a terminal to be used in further consideration of user's convenience.

2. Background

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

Specifically, as performance of a recently released camera is increasingly enhanced, the demand for a method of facilitating an image taken through such a camera or a method of providing a result image by automatically editing the image is rising.

SUMMARY OF THE INVENTION

Accordingly, embodiments of the present invention are directed to a mobile terminal and controlling method thereof that substantially obviate one or more problems due to limitations and disadvantages of the related art.

One object of the present invention is to provide a mobile terminal and controlling method thereof, by which a moving image can be created in the course of photographing (or picture-taking) in a manner of capturing a motion of a subject and then reflecting the captured motion.

Another object of the present invention is to provide a mobile terminal and controlling method thereof, by which a photo full of movement can be delivered in a manner of recording ambient sounds in the course of photographing and then outputting both of the recorded ambient sounds and the taken photo in viewing the taken photo.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal according to one embodiment of the present invention may include a camera and a controller controlling the camera to photograph a plurality of images consecutively, the controller determining an unchangeable region having a variation equal to or smaller than a reference value and a changeable region having the variation greater than the reference value in each of a plurality of the photographed images using the variations among a plurality of the photographed images, the controller creating a moving image by merging an image generated from combining the changeable regions in a plurality of the photographed images with the unchangeable region.

In another aspect of the present invention, a method of controlling a mobile terminal according to another embodiment of the present invention may include the steps of photographing a plurality of images consecutively, determining an unchangeable region having a variation equal to or smaller than a reference value and a changeable region having the variation greater than the reference value in each of a plurality of the photographed images using the variations among a plurality of the photographed images, and creating a moving image by merging an image generated from combining the changeable regions in a plurality of the photographed images with the unchangeable region.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The embodiments will be described in detail with reference to the following drawings in which like reference numerals refer to like elements wherein:

FIG. 1 is a block diagram of a mobile terminal according to one embodiment of the present invention;

FIGS. 3 to 5 are diagrams for one example of a method of creating a moving image according to one embodiment of the present invention;

FIG. 13 is a diagram for one example of states in editing a moving image according to one embodiment of the present invention.

DETAILED DESCRIPTION

Figure 2A:
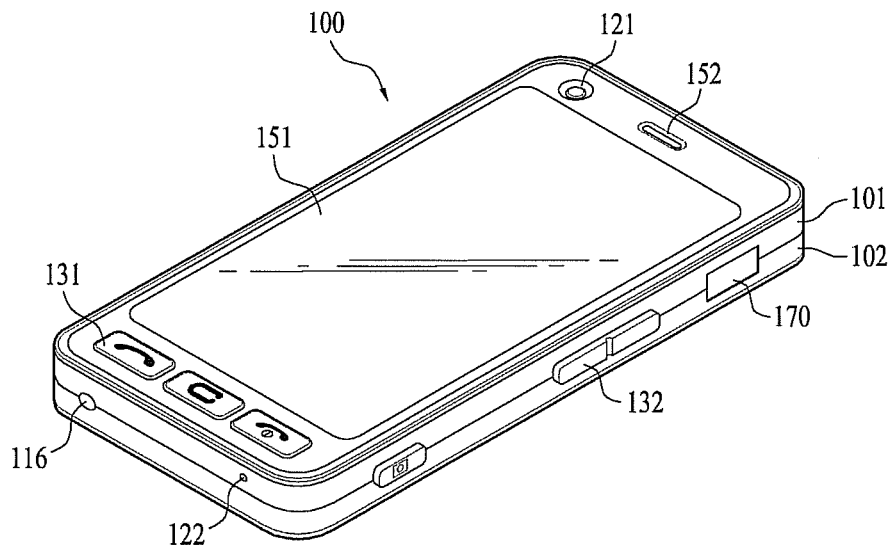
FIG. 2A is a front perspective diagram of a mobile terminal according to one embodiment of the present invention.

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile terminals, such as mobile phones, user equipment, smart phones, mobile computers, digital broadcast terminals, personal digital assistants, portable multimedia players (PMP) and navigators.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

At least two broadcast receiving modules 111 can be provided to the mobile terminal 100 in pursuit of simultaneous receptions of at least two broadcast channels or broadcast channel switching facilitation.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), DVB-CBMS, OMA-BCAST, the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Gobal System for Mobile communications), CDMA (Code Division Multiple Access), WCDMA (Wideband CDMA) and so on. Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

According to the current technology, the GPS module 115 is able to precisely calculate current 3-dimensional position information based on at least one of longitude, latitude and altitude and direction (or orientation) by calculating distance information and precise time information from at least three satellites and then applying triangulation to the calculated information. Currently, location and time informations are calculated using three satellites, and errors of the calculated location position and time informations are then amended using another satellite. Besides, the GPS module 115 is able to calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100, and free-falling of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and a sensor for detecting a touch action (hereinafter called 'touch sensor') configures a mutual layer structure (hereinafter called 'touchscreen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 1, a proximity sensor (141) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display unit 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectable to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

FIG. 2A is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the terminal body, and more particularly, to the front case 101.

The display 151 occupies most of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display 151 or the like can be inputted to the second manipulating unit 132.

Figure 2B:
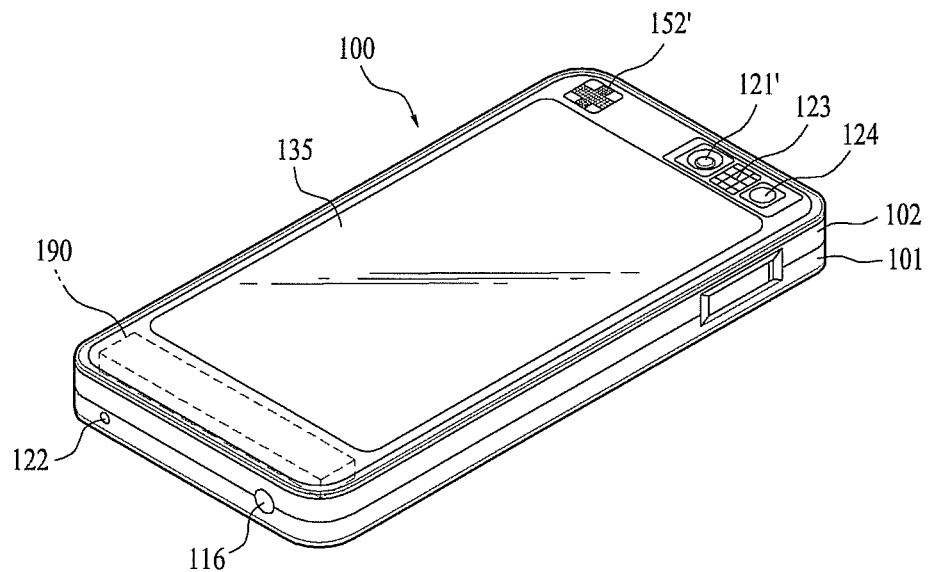
FIG. 2B is a rear perspective diagram of a mobile terminal according to one embodiment of the present invention.

FIG. 2B is a perspective diagram of a backside of the terminal shown in FIG. 2A.

Referring to FIG. 2B, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2A and may be used for implementation of a speakerphone mode in talking over the terminal.

A broadcast signal receiving antenna 124 can be additionally provided to the lateral side of the terminal body as well as an antenna for communication or the like. The antenna 124 constructing a portion of the broadcast receiving module 111 shown in FIG. 1 can be retractably provided to the terminal body.

A power supply unit 190 for supplying a power to the terminal 100 is provided to the terminal body. And, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmittive type like the display 151. In this case, if the display 151 is configured to output visual information from its both faces, it is able to recognize the visual information via the touchpad 135 as well. The information outputted from both of the faces can be entirely controlled by the touchpad 135. Alternatively, a display is further provided to the touchpad 135 so that a touchscreen can be provided to the rear case 102 as well.

The touchpad 135 is activated by interconnecting with the display 151 of the front case 101. The touchpad 135 can be provided in rear of the display 151 in parallel. The touchpad 135 can have a size equal to or smaller than that of the display 151.

In the following description, embodiments relating to a controlling method implemented in the above-configured mobile terminal shall be explained with reference to the accompanying drawings.

[Method of Creating a Moving Image]

According to embodiments of the present invention, consecutively taken photos are used to create a moving image. A method of consecutively taking photos shall be described later. Instead, a method of creating a moving image using the consecutively taken photos according to an embodiment of the present invention is described in detail with reference to FIGS. 3 to 5 as follows.

Figure 3:
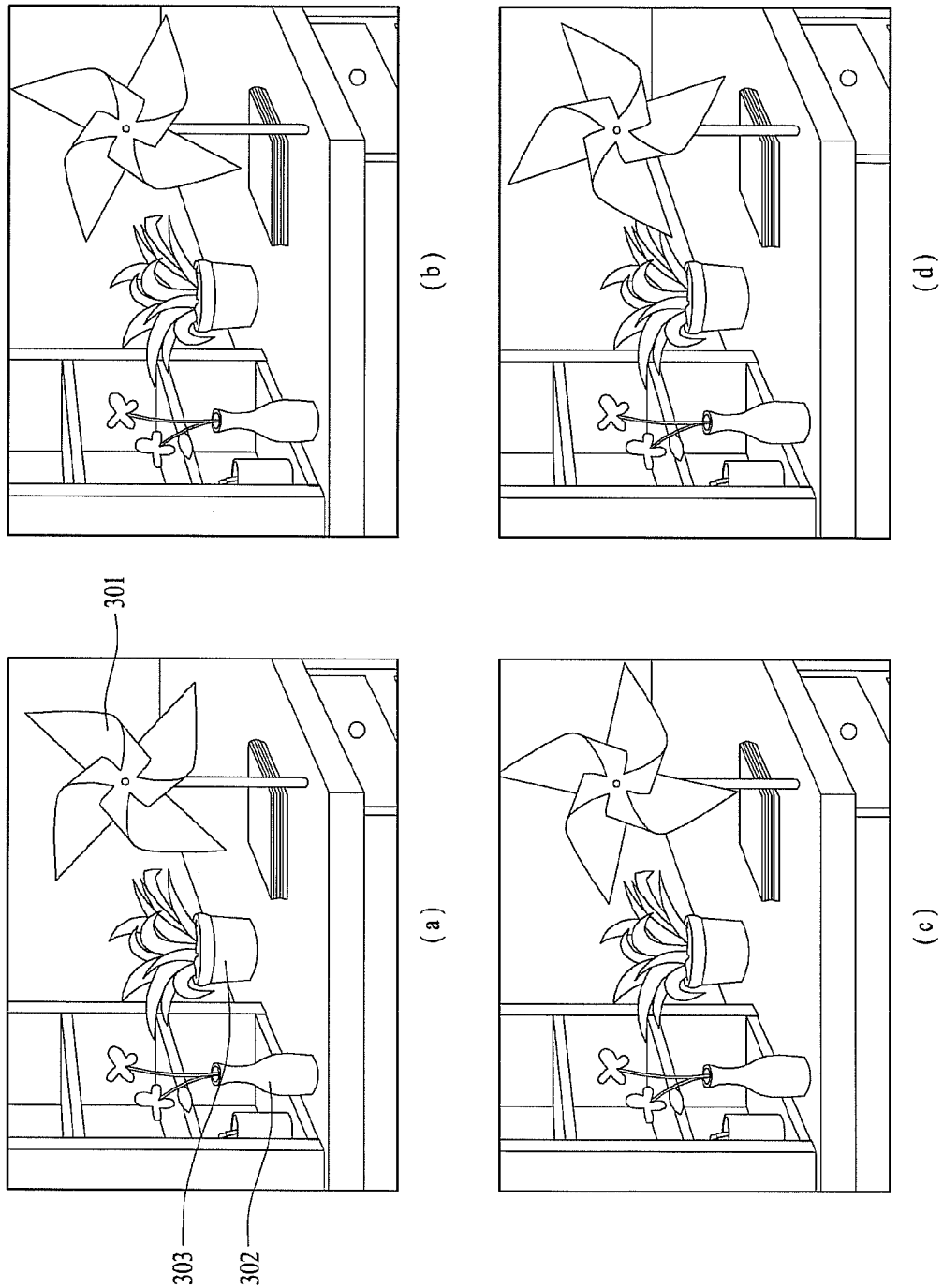
Figure 4:
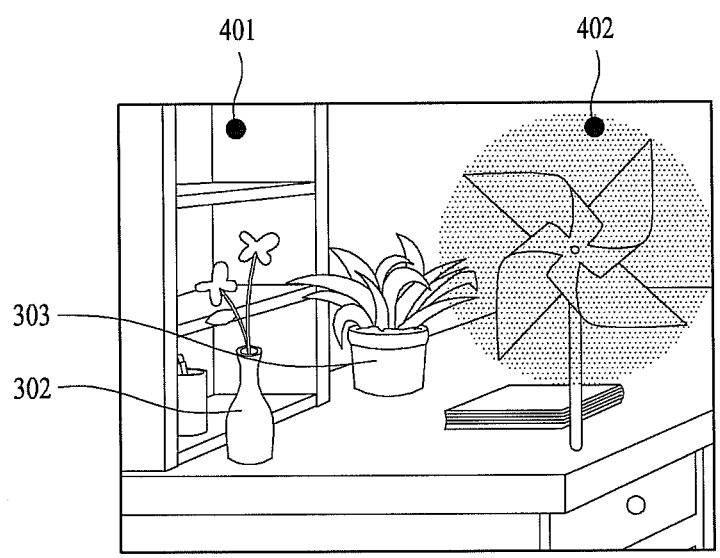

FIGS. 3 to 5 are diagrams for one example of a method of creating a moving image according to one embodiment of the present invention. In particular, FIGS. 3 (a) to 3 (d) show photos consecutively taken in order. The drawings shown in FIG. 3 may include the photos taken in a prescribed time interval (e.g., ¼ second).

Referring to FIG. 3, each of the taken photos includes a pinwheel, a vase 302 and a flowerpot 303. In this case, the vase 302, the flowerpot 303 and/or the background of the photo may not change despite that they are photographed consecutively. Yet, since the pinwheel 301 can move in the course of the consecutive photographing, a motion of the pinwheel 301 can be reflected by the consecutively taken photos [cf. FIGS. 3 (a) to 3 (d)].

According to the present invention, a region having no change (particularly, a case that a change is smaller than a reference value) and a region having a change (particularly, a case that a change is greater than a reference value) are analyzed and a moving image is created using the analyzed regions. In the following description, the region having no change shall be named an unchangeable region and the region having a change shall be named a changeable region.

FIG. 4 is a diagram to describe a changeable region and an unchangeable region.

Referring to FIG. 4, a changeable region 402 having a change attributed to the pinwheel 301 is represented dark to be discriminated from an unchangeable region 401 including the vase 302, the flowerpot 303, the background and the like. According to embodiments of the present invention, when a moving image is created, it is proposed that a motion is represented using the changeable region 402 only by fixing the unchangeable region 401. According to an embodiment of the present invention, by fixing an image for the unchangeable region, it is able to reduce a data size of a created image when a moving image is created.

On the other hand, although FIG. 4 shows one example that the changeable region 402 is represented dark in order to discriminate the unchangeable region 401 and the changeable region 402 from each other, no limitation is put on a method of discriminating the two regions from each other. For instance, the two regions may be discriminated from each other in a manner of indicating the changeable region 402 enclosed by a line, identifying the changeable region 402 using a box indicator, and the like.

Referring to FIG. 5, unlike FIG. 4, the unchangeable region 401 is represented dark. In a bottom part of FIG. 5, changeable regions 402 are shown in order of time. Thus, according to an embodiment of the present invention, it is able to create a single moving image in a manner of discriminating one unchangeable region 401 and a plurality of changeable regions 402 and then combining those regions together.

A moving image created by a method according to one embodiment of the present invention can provide the feelings of movement and sensibility that cannot be provided by a conventional photo. An image according to an embodiment of the present invention can represent a motion of a specifically interesting region and provide audio data synchronized with the corresponding photographing, thereby enabling a user to experience the feelings of movement and sensibility on the corresponding photographing.

Yet, the image according to the present invention has differences from the conventional video. The conventional video provides a moving image in a manner of taking images by predetermined periods and then playing the taken images by the same photographing periods. Thus, if a plurality of the images are played back in predetermined time intervals, a size of data required for creating a video increases inevitably.

Due to the considerable data size required by the video, utilization of the video is limited in consideration of the limited storage capability of a mobile terminal.

On the contrary, a moving image according to an embodiment of the present invention complements the disadvantages of the conventional video in a manner of focusing on a user's interesting region, observing changes of the interesting region, and having the observed changes reflected by the image. Therefore, the present invention can obtain maximum effects using minimum data.

In creating such a moving image, one used unchangeable region 401 can be obtained from an image that becomes a basis to create a moving image like the embodiment of the present invention. The image becoming the basis can be selected by a user or may include a photo taken in a specific view (e.g., a shutter input applied view, etc.). In particular, the image becoming the basis has the concept of an immovable reference still shot. In the following description, such an image becoming a basis shall be named a reference photo.

[Photographing Method]

A method of taking photos consecutively in order to create a moving image is described with reference to FIG. 6 and FIG. 7 as follows.

Figure 6:
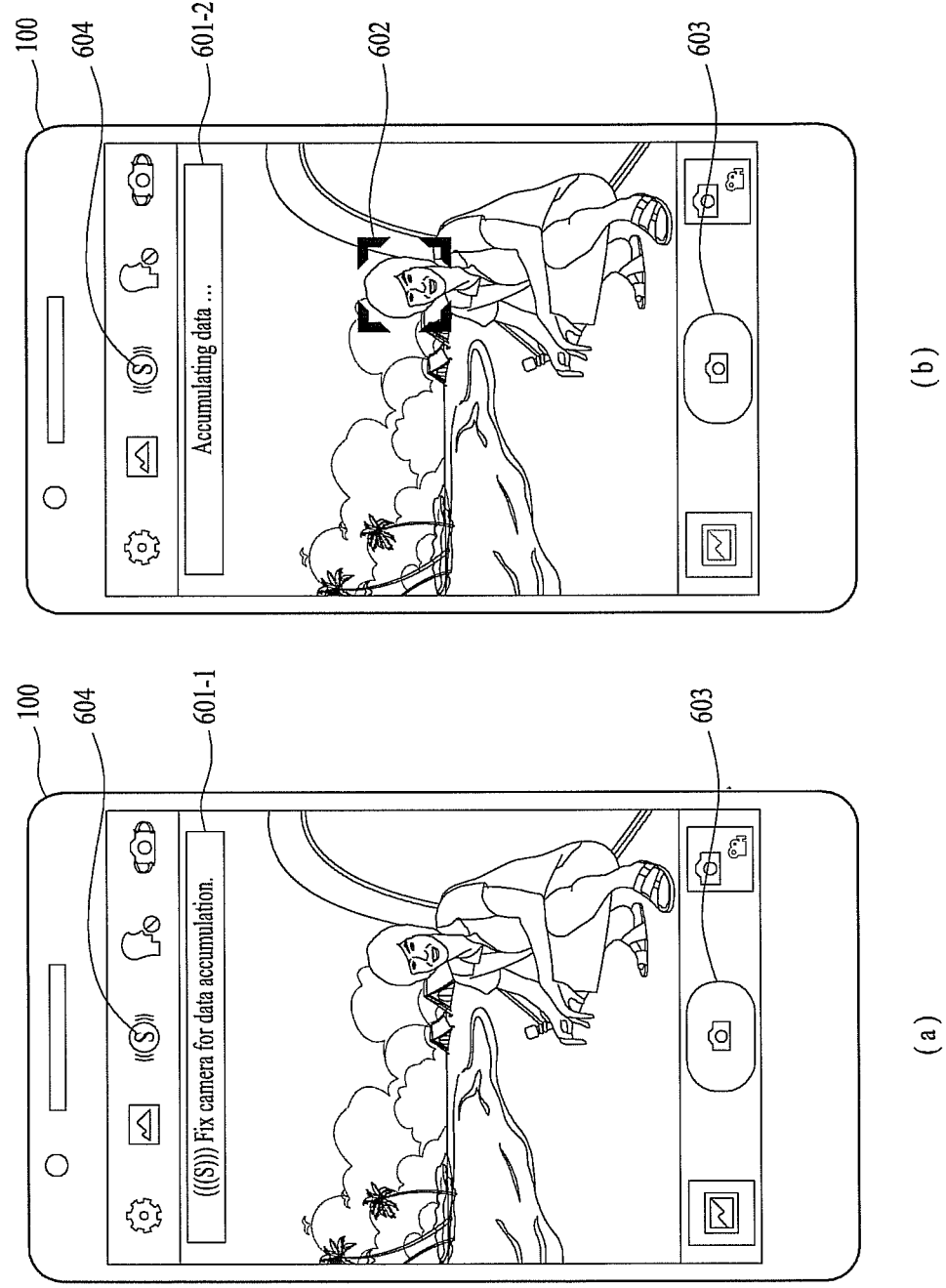
FIG. 6 is a diagram for states of a mobile terminal used to take photos consecutively in order to create a moving image according to one embodiment of the present invention.

FIG. 6 is a diagram for states of a mobile terminal used to take photos consecutively in order to create a moving image according to one embodiment of the present invention.

Figure 7:
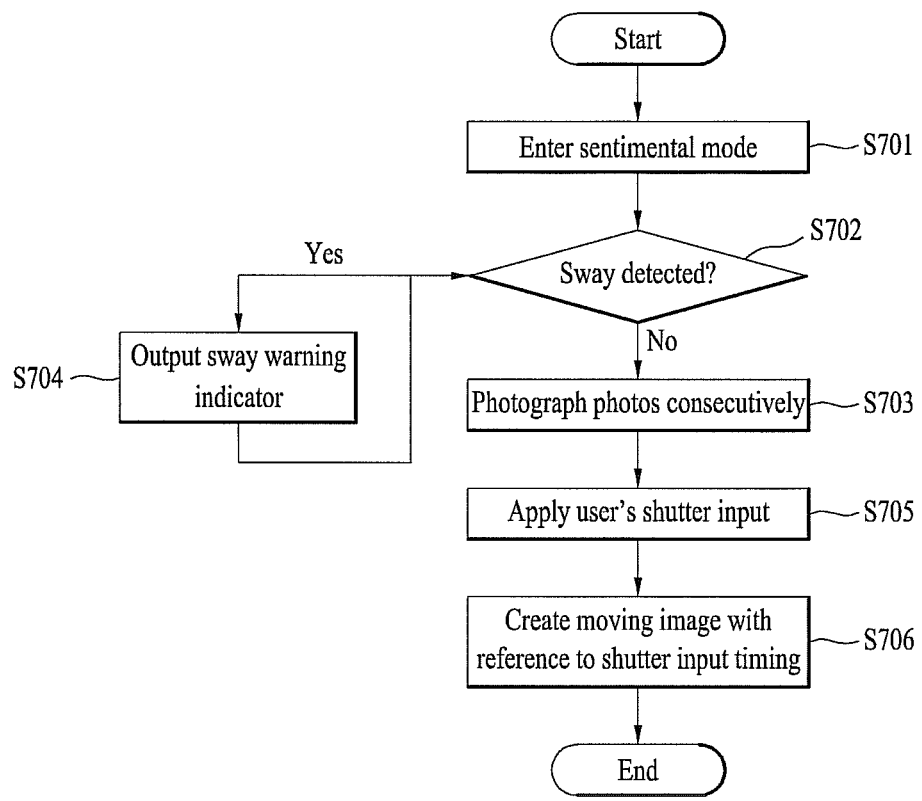
FIG. 7 is a flowchart for a method of taking photos consecutively in order to create a moving image according to one embodiment of the present invention.

FIG. 7 is a flowchart for a method of taking photos consecutively in order to create a moving image according to one embodiment of the present invention.

Referring to FIG. 6 and FIG. 7, a photographing mode (hereinafter named a sentimental mode) for creating a moving image according to an embodiment of the present invention is entered [S701]. In order to enter the sentimental mode, a prescribed hardware button is inputted or a menu for entering the sentimental mode displayed in a normal photographing mode is touched, by which an entering method may be non-limited.

In order to provide a user with a preview screen in the sentimental mode like the normal photographing mode, the mobile terminal 100 outputs a video data inputted through the camera 121 on the display unit 151.

Moreover, a sentimental indicator 604 may be further outputted to indicate the sentimental mode. Hence, a user of the mobile terminal 100 can use the sentimental indicator 604 to check what a current photographing mode is.

In the sentimental mode, the controller 180 detects the sway of the mobile terminal 100 using the sensing unit 140 [S702]. This is because images consecutively photographed in a somewhat fixed state are required for creating a moving image according to embodiments of the present invention. Therefore, when the mobile terminal 100 sways, the controller 180 detects the sway of the mobile terminal 100 using the sensing unit 140 in order to warn the user of the sway.

In case of detecting the sway of the mobile terminal 100 in the step S702, the controller 180 enters a step S704. In the step S704, the controller 180 outputs a sway warning indicator 601-1. In doing so, referring to FIG. 6, the controller 180 can output the indicator 601-1 to a prescribed region of the display unit 151. And, the indicator 601-1 can output a text 'Fix the camera for data accumulation' in order to warn the user of the sway to reduce [FIG. 6 (a)]. The controller 180 then goes back to the step S702.

Meanwhile, the sentimental indicator 604 can further indicate a level of the sway. For instance, the sentimental indicator 604 can be implemented into an indicator '((S))' shown in FIG. 6 (a). In particular, the number of parentheses provided to the right and left sides of the centered alphabet 'S' can indicate a level of the sway. In more particular, if the sway is small, the sentimental indicator 604 shown in FIG. 6 (a) can be represented as '(S)'. As the sway level increases, the sentimental indicator 604 can be represented as '((S))', '(((S)))' and the like in order. Therefore, a user can obtain the state of the mobile terminal 100 through the sentimental indicator 604 indicating the sway level.

If the sway of the mobile terminal 100 is not detected in the step S702, the controller 180 enters a step S703.

In the step S703, the controller 180 can accumulate the consecutive photographing data. In doing so, the controller 180 can also output an indicator 601-2 indicating that data are being accumulated. In the example shown in FIG. 6 (b), the indicator 601-2 can output a text 'Data accumulation in progress' as well.

Moreover, in the step S703, the controller 180 can accumulate audio data together with the accumulation of the photographing data. Since a moving image created by the method according to one embodiment of the present invention can include audio data, the controller 180 accumulates the audio data in the step S703.

Since the mobile terminal 100 recognizes a sway-free state in the step S703, the consecutive photographing data can be used as photo data to create the moving images of the embodiments of the present invention.

In the step S703, the controller 180 can output a focus indicator 602 indicating a focused location together with the above-mentioned indicator 601-2. If a user intends to change a location of a focus, the user can change the location of the focus by touching a prescribed point on an image displayed on the display unit 151.

Meanwhile, according to another embodiment of the present invention, after a focus has been set, the controller 180 can control the focus indicator 602 to disappear. And, the controller 180 can set a start point of accumulating the consecutive photographing data in the step S703 to a point after the focus setup (e.g., a point after the focus indicator has disappeared). This is because the photographing data is preferably accumulated after the focus setup.

Since the focus indicator 602 is identical to a general focus indicator, its details shall be omitted from the following description.

In a step S705, the controller 180 receives a user's shutter input 603. In a step S706, the controller 180 creates a moving image with reference to a timing point of the user's shutter input 603.

If the mobile terminal according to one embodiment of the present invention enters the sentimental mode, it keeps accumulating the photographing data without a separate input using the camera 121 unless detecting the sway. Subsequently, the mobile terminal creates a moving image using a taken photo at the timing point of applying the user's shutter input 603 and photos consecutively taken since a prescribed time before the shutter input applied timing point. In the latter case, an end timing point of the consecutively taken photos may correspond to the timing point of applying the user's shutter input 603. In particular, it is able to use data of photos consecutively taken in advance before the timing point of applying the user's shutter input 603.

Meanwhile, at the timing point of the user's shutter input 603, data may not be sufficiently accumulated. In this case, the controller 180 can provide a user with a guide indicating that the data accumulation is insufficient. And, the controller 180 can further output a message in order to guide the user to fix the camera for additional data accumulation.

The generation of the consecutive photographing data may be non-limited by the above description. According to another embodiment of the present invention, with reference to the timing point of applying the user's shutter input 603, it is able to utilize data of photos consecutively taken before and after the timing point.

Meanwhile, while the photo data is consecutively generated in the step S703, if the way of the mobile terminal 100 is detected, it is apparent that the step S702 can be reentered.

In the step S706, as mentioned in the foregoing description with reference to FIGS. 3 to 5, the mobile terminal 100 according to one embodiment of the present invention can create a moving image automatically by utilizing the data accumulated in the step S703.

Meanwhile, when photos are consecutively taken in general, a region having a small change may exist despite that a region having a considerable change may exist. If so, it may be impossible to clearly discriminate a boundary between the changeable region 402 and the unchangeable region 401.

Therefore, according to features of another embodiment of the present invention, proposed is a method for a user to set up the unchangeable region 401 and the changeable region 402 in the step S706 of creating the moving image.

Proposed are two kinds of methods of setting the unchangeable region 401 and the changeable region 402 according to embodiments of the present invention.

In a 1$^{st}$ method according to the embodiment, when there are a plurality of changeable regions 402, a user selects the changeable regions 402 in part. And, a moving image is then created using the selected changeable regions 402. The 1$^{st}$ method according to the embodiment shall be described in detail with reference to FIG. 8 and FIG. 9.

In a 2$^{nd}$ method according to the embodiment, it is able to set the unchangeable region 401 and the changeable region 402 by adjusting a reference value of a variation. If the variation is greater than the reference value, a corresponding region is set as the changeable region 402. If the variation is smaller than the reference value, a corresponding region is set as the unchangeable region 401. Hence, if a user intends to detect a big change only, the reference value may be set high. If a user intends to detect a small change as well, the reference value can be set low. The $2^{nd}$ method according to the embodiment shall be described in detail with reference to FIG. 10 later.

Figure 8:
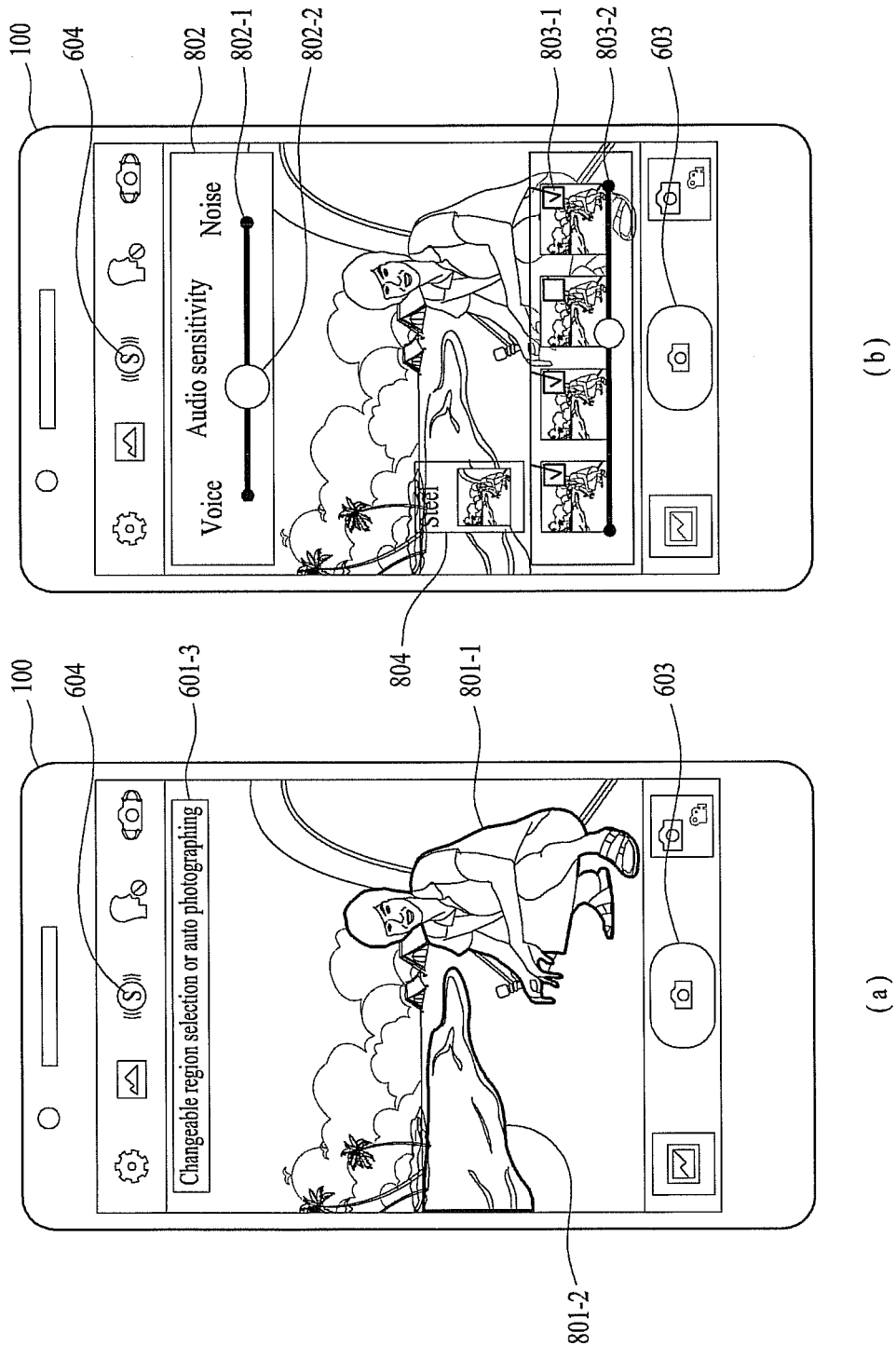
FIG. 8 is a diagram for states of a method of selecting one of candidates for a changeable region according to one embodiment of the present invention.

FIG. 8 is a diagram for states of a method of selecting one of candidates for a changeable region according to one embodiment of the present invention.

Figure 9:
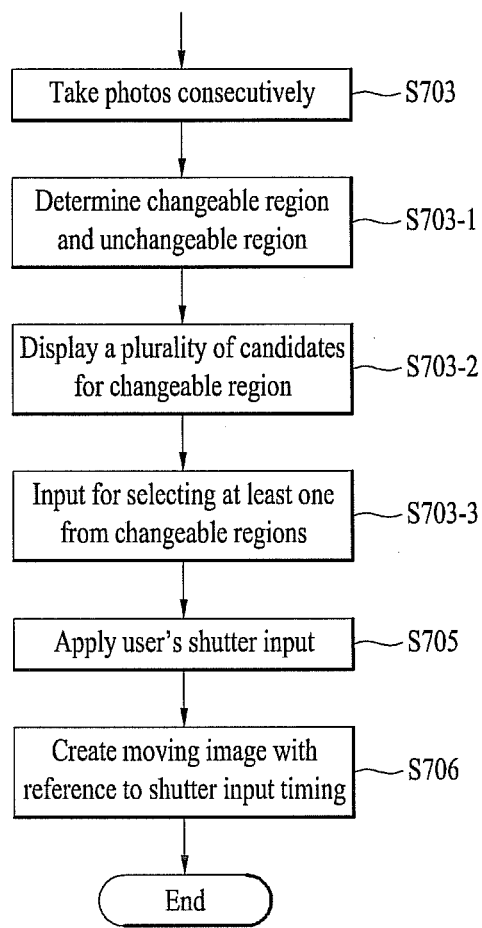
FIG. 9 is a flowchart of a method of selecting one of candidates for a changeable region according to one embodiment of the present invention.

FIG. 9 is a flowchart of a method of selecting one of candidates for a changeable region according to one embodiment of the present invention. In particular, the flowchart shown in FIG. 9 can be substituted for the former steps S703 to S706 of the flowchart shown in FIG. 7.

In the embodiment described with reference to FIG. 8 and FIG. 9, the mobile 100 has some of the candidates for the changeable region 402 in part and then creates a moving image using a motion of the selected changeable region 402. In particular, the unselected candidate for the changeable region 402 is treated as the unchangeable region 401 and can be then outputted as a fixed image on the moving image.

In the following description, a method of selecting one of candidates for a changeable region according to one embodiment of the present invention is explained with reference to FIG. 8 and FIG. 9.

Referring to FIG. 8 and FIG. 9, the mobile terminal 100 analyzes the consecutive photographing data [S703] and then determines the changeable region 402 and the unchangeable region 401 [S703-1]. The mobile terminal 100 displays candidates for the changeable region 402 to have the changeable region 402 selected [S703-2]. In doing so, referring to FIG. 8 (a), the mobile terminal 100 outputs an indicator 801 to identify the candidate for the changeable region 402.

The controller 180 receives a selection of the changeable region 402 from a user [S703-3]. For instance, if receiving an input of a touch to the changeable region 402, the controller 180 may change a color of the indicator 801 or make the indicator 801 blink, in order to have the selected region identifiable. Alternatively, the corresponding selection can be made by an input of a long touch to the changeable region 402 or an input of a check or circle-drawing touch gesture. As no limitation is put on a method of selecting the changeable region 402, the changeable region selecting method may be non-limited by the above-mentioned method.

In creating a moving image [S706], the controller 180 of the embodiment of the present invention creates the moving image not by reflecting the unselected changeable region 402 but by reflecting the selected changeable region 402 only.

Meanwhile, if the shutter input 603 is received from the user while no changeable region 402 is selected in the step S703-3, as mentioned in the foregoing description with reference to FIG. 6 and FIG. 7, a moving image is crated not based on a user's selection.

While a specific changeable region 402 is selected, if the shutter input 603 is received from the user, the controller 180 creates a moving image using the selected changeable region 402 and the unchangeable region 401 with reference to a timing point of receiving the shutter input 603 (i.e., setting the photo taken at the shutter input received timing point as a reference photo) [S706].

On the other hand, according to another embodiment of the present invention, in order to create the moving image in the step S706, the controller 180 can further receives an input of a prescribed setting item. This setting item is described with reference to FIG. 8 (b) as follows.

FIG. 8 (b) is a diagram of a state of receiving an input of an additional setting item in order to create a moving image according to one embodiment of the present invention. Referring to FIG. 8 (b), the controller 180 can output at least one of an audio sensitivity adjusting menu 802, a photographed photo selecting menu 803 and a reference photo setting menu 804.

The audio sensitivity adjusting menu 802 is the menu for adjusting audio sensitivity to apply to the noise cancelling of audio data recorded through the microphone 122. When the noise cancelling is applied, if the audio sensitivity is high, a ratio of a background sound in the audio data recorded through the microphone 122 is lowered but a human voice ratio is raised. On the contrary, if the audio sensitivity is low, a ratio of a background sound in the audio data recorded through the microphone 122 is raised but a human voice ratio is lowered.

In order to adjust the audio sensitivity, in the example shown in FIG. 8, the audio sensitivity adjusting menu 802 outputs an adjust bar 802-1 and an adjusted object 802-2 movable right and left on the adjust bar 802-1. If the adjusted object 802-2 moves toward a left direction of the adjust bar 802-1, the controller 180 can control the audio sensitivity to be raised. If the adjusted object 802-2 moves toward a right direction of the adjust bar 802-1, the controller 180 can control the audio sensitivity to be lowered. The movement of the adjusted object 802-2 on the adjust bar 802-1 can be performed by a general touch gesture. For instance, the adjusted object 802-2 can move in a manner of being touched and dragged to a prescribed position.

Meanwhile, as the audio sensitivity is adjusted, in order to inform a user of a result of the adjustment, when the audio sensitivity is changed, the controller 180 can output audio data having the corresponding audio sensitivity applied thereto using the audio output unit 152.

According to another embodiment of the present invention, it is able to consider directionality of an inputted audio signal in accumulating audio data. For instance, referring to FIG. 8 (a), if a specific region is selected from the candidates for the changeable region 402, the controller 180 can zoom in on the audio data received from the selected region. For instance, if a wave region 801-2 is selected in FIG. 8 (a), the controller 180 can intensively record the audio data received from the wave direction. In this case, the intensive recording means that the controller 180 amplifies the strength of the audio data from a specific direction but attenuates the strengths of the audio data received from other directions.

The photographed photo selecting menu 803 is the menu for selecting a user-desired photo from the consecutively taken photos. In particular, since the consecutively taken photos include the photos taken in prescribed time intervals irrespective of user's intention, it is able to create a moving image by removing the undesired photos using the photographed photo selecting menu 803.

In the example of the photographed photo selecting menu 803 shown in FIG. 8, the controller 180 can output thumbnails of the consecutively taken photos. When there are too many thumbnails of the photos, if it is difficult to display them all within the photographed photo selecting menu 803, some of the thumbnails are displayed while the rest of the thumbnails are displayable through an outputted scroll 803-2.

The controller 180 can control a photo, of which check box 803-1 provided to the photographed photo selecting menu 803 is checked, to be included in the creation of the moving image. For example, the selection and cancellation of the check box 803-1 can be alternately performed in response to an input of a touch to the corresponding thumbnail like a general method.

Finally, the reference photo setting menu 604 outputs a setting menu for outputting or changing a reference photo. In this case, as mentioned in the foregoing description with reference to FIG. 5, the reference photo means a photo that becomes a basis in creating a moving image. According to one embodiment of the present invention, the reference photo can be set to a photo taken at the timing of applying a shutter input. Therefore, the reference photo outputted to the reference photo setting menu 804 may basically include a photo taken at the timing point of applying a shutter input.

According to one embodiment of the present invention, when a user intends to change a reference photo, it is able to utilize the photographed photo selecting menu 803. The user can select a photo, which is desired to be set as a reference photo, from thumbnails outputted to the photographed photo selecting menu 803. For instance, if a long touch input is applied to one of the thumbnails outputted to the photographed photo selecting menu 803, the controller 180 can set a photo corresponding to the thumbnail as a reference photo. In particular, the reference photo has the meaning of a user's most favorite photo (e.g., a best shot). If a person in a photo closes his eyes or stares at another spot, it is unable to set the corresponding photo as a reference photo. Hence, according to an embodiment of the present invention, an interface for a user to select a reference photo is provided.

According to another embodiment of the present invention, if a specific photo is selected from the thumbnails outputted to the photographed photo selecting menu 803, the controller 180 can output the selected photo as a full screen. After a user has viewed the photo outputted as the full screen, if the user intends to the viewed photo as his reference photo, the user can set the corresponding photo as the reference photo. In particular, if an input of a long touch to the full screen is received, the controller 180 can set the selected photo as the reference photo in response to the received input.

Figure 10:
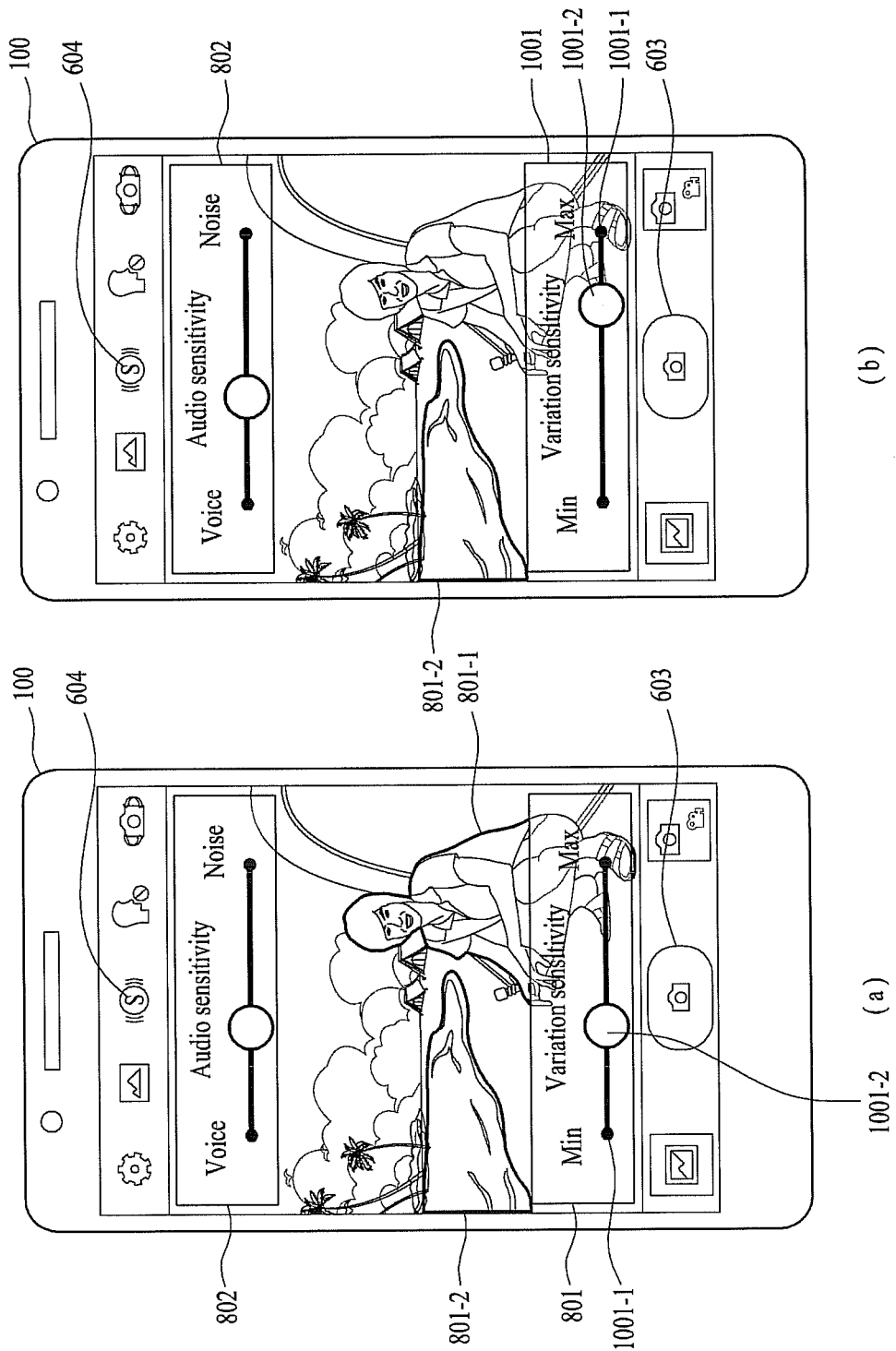
FIG. 10 is a diagram for state of setting a changeable region 402 and an unchangeable region 401 through adjustment of a reference value according to one embodiment of the present invention.

FIG. 10 is a diagram for state of setting a changeable region 402 and an unchangeable region 401 through adjustment of a reference value according to one embodiment of the present invention.

Referring to FIG. 10 (a) and FIG. 10 (b), if consecutively taken photo data are accumulated, the controller 180 can output an audio sensitivity adjusting menu 802 and/or a variation sensitivity adjusting menu 1001.

The variation sensitivity adjusting menu 1001 is the menu for adjusting a reference value for determining the changeable region 402. In determining the changeable region 402, if a reference value of a variation is raised, a region having a big change can be determined as the changeable region 402 only. On the contrary, if a reference value of a variation is lowered, a region having a small change only can be determined as the changeable region 402.

In order to adjust the reference value, in the example shown in FIG. 10, the variation sensitivity adjusting menu 1001 outputs an adjust bar 1001-1 and an adjusted object 1001-2 movable right and left on the adjust bar 1001-1. If the adjusted object 1001-2 moves toward a right direction of the adjust bar 1001-1, the controller 180 can control the reference value to be raised. If the adjusted object 1001-2 moves toward a left direction of the adjust bar 1001-1, the controller 180 can control the reference value to be lowered. The movement of the adjusted object 1001-2 on the adjust bar 1001-1 can be performed by a general touch gesture. For instance, the adjusted object 1001-2 can move in a manner of being touched and dragged to a prescribed position.

Referring to FIG. 10 (a), as a position of the adjusted object 1001-2 is adjusted to the left on the adjust bar 1001-1 of the variation sensitivity adjusting menu 1001, the reference value for determining the changeable region 402 is set low. As the reference value is set to a relatively low value, a region having a small change can be determined as the changeable region 402 as well. In the example shown in FIG. 10 (a), a wave region 801-2 is a region having a relatively big variation and a character region 801-1 is a region having a relatively small variation. In this case, in the example having the reference value set low in FIG. 10 (a), both of the regions are determined as the changeable regions 402.

On the contrary, as a position of the adjusted object 1001-2 is adjusted to the right on the adjust bar 1001-1 of the variation sensitivity adjusting menu 1001, the reference value for determining the changeable region 402 is set high. In this case, the character region 901-1 having a relatively small variation is not determined as the changeable region 402 but the wave region 801-2 having a relatively big variation can be determined as the changeable region 402. Therefore, an indicator for identifying the changeable region is not outputted from the character region 801-1.

Meanwhile, the mobile terminal 100 according to another embodiment of the present invention is proposed to create a moving image by recognizing a user's voice inputted through the microphone 122. In particular, in the example shown in FIG. 10, if a word 'eaves' is recognized from the voice inputted through the microphone 122, a wave object is identified from consecutively taken photos and the identified wave object can be then set as the changeable region 402. Thus, if the changeable region 402 is set using the voice, it is advantageous in that the process for setting the changeable region 402 is unnecessary.

So far, in order to create a moving image, the method of taking photos and creating the moving image has been described. In the following description, a method of reading or viewing the created moving image is explained.

[Representation Method Depending on Type of Change]

According to one embodiment of the present invention, a type of a change is recognized and an image outputting scheme can be set different for the recognized type of the change. This method is described in detail with reference to FIG. 11 as follows.

Figure 11:
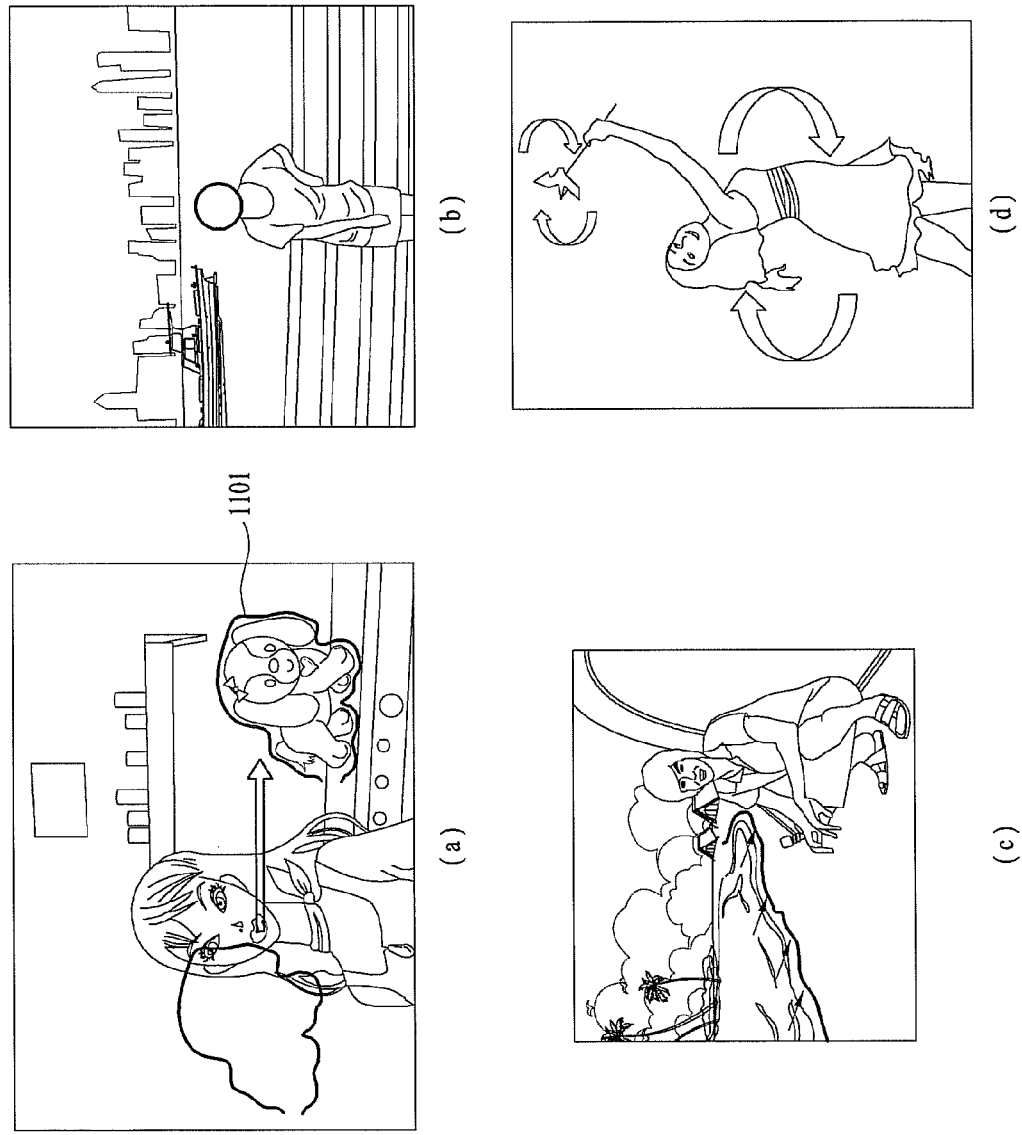
FIG. 11 is a diagram for one example of an output scheme depending on a type of change according to one embodiment of the present invention.

FIG. 11 is a diagram for one example of an output scheme depending on a type of change according to one embodiment of the present invention.

Referring to FIG. 11, changes can be mainly categorized into 3 types.

First of all, a $1^{st}$ type corresponds to a movement change of an object shown in FIG. 11 (a). Regarding a photo shown in FIG. 11 (a), an animal 1101 is passing in a region behind a subject 1102 becoming a center. Hence, a moving image created by a method according to one embodiment of the present invention can reflect a motion of the subject 1102 and/or a motion of the animal 1101. In doing so, if the motion of the animal 1101 corresponds to a one-time movement change from one region to another region, when a created image is outputted, the controller 180 can output the created image in a manner of playing the created image one time only instead of repeatedly outputting the movement change.

After completion of the one-time playback, if a user inputs an additional play request, the movement change can be outputted again. Moreover, the controller 180 can separately recognize the motion of the subject 1102 and the motion of the animal 1101. In particular, the controller 180 can determine that the motion of the subject 1102 and the motion of the animal 1101 are a repetitive motion change and a one-time movement change. In this case, the controller 180 may control the motion of the subject 1102 to be repeatedly outputted but may control the motion of the animal 1101 to be outputted in a manner of being played back one time only.

Secondly, a $2^{nd}$ type corresponds to a change of color outputted in FIG. 11 (b). Referring to FIG. 11 (b), a night view of buildings is photographed as a background of a centered subject. In case of a moving image created by a method according to one embodiment of the present invention, a motion of the subject and/or a color change of the background can be reflected.

If so, when the moving image shown in FIG. 11 (b) is outputted, the controller 180 can control the color change of the background to be repeatedly outputted. This is because such a color change is natural despite repetitive modifications.

Finally, a $3^{rd}$ type corresponds to such a repetitive motion change as shown in FIG. 11 (c) or FIG. 11 (d). The photo shown in FIG. 11 (c) is the photo taken through the processes shown in FIGS. 6 to 10. In this photo, a motion of waves is a repetitive motion change in a manner that the tide flows in and out. And, a lady shown in FIG. 11 (d) performs a repetitive rotational movement.

In outputting the above-described moving image having the repetitive change, the controller 180 of one embodiment of the present invention outputs the repetitive change consecutively instead of outputting it once.

[Result Product Check in Gallery]

Figure 12:
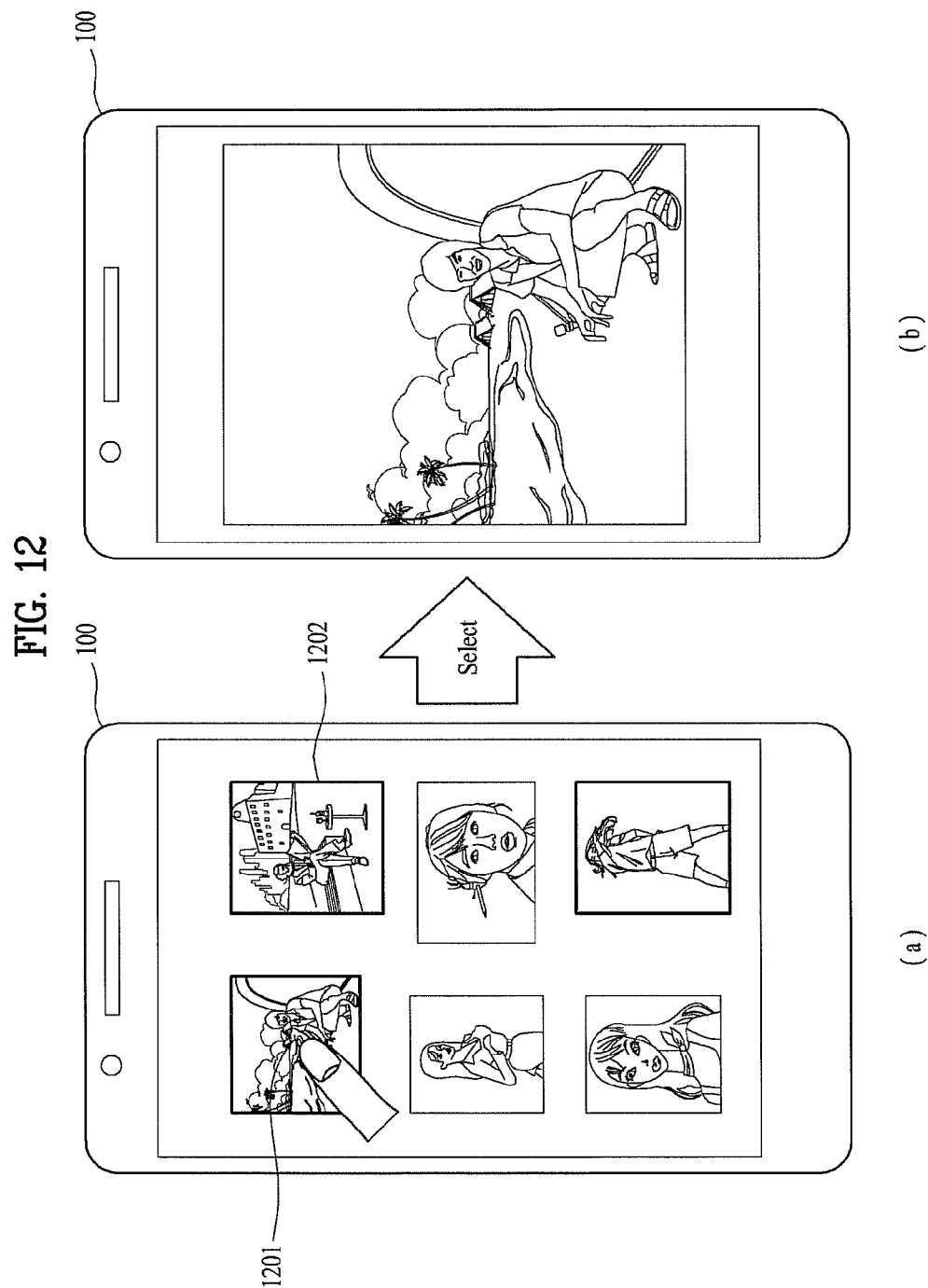
FIG. 12 is a diagram for one example of a method of checking a result product in a photo gallery.

FIG. 12 is a diagram for one example of a method of checking a result product in a photo gallery.

FIG. 12 (a) shows a thumbnail view in a gallery. In this case, the controller 180 of one embodiment of the present invention can output a moving image among the photos displayed on the thumbnail view in a manner that the moving image is identifiable from other normal images. Referring to FIG. 12 (a), a thumbnail corresponding to the moving image is indicated by an outline 1202, thereby being discriminated other thumbnails corresponding to the normal images.

When a prescribed image is selected from a thumbnail view, FIG. 12 (b) shows a state of viewing the selected image as a full screen. In case that the selected image corresponds to a moving image according to an embodiment of the present invention, as mentioned in the foregoing description with reference to FIG. 11, the controller 180 can output the image in a manner of differentiating an outputting scheme depending on a type of a motion change.

[Editing a Moving Image]

According to one embodiment of the present invention, it is able to edit an image despite that the image is a creation-complete moving image. Editing of a moving image means a change of photos used in creating the moving image. And, a reference photo is included in the used photos.

FIG. 13 is a diagram for one example of states in editing a moving image according to one embodiment of the present invention.

In particular, FIG. 13 (a) is a diagram for one example of changing a reference photo. According to one embodiment of the present invention, the controller 180 can output at least one of a reference photo output region 1301, a photographed photo selecting menu 803, a save object 1303 and a preview region 1302 to an image editing screen.

In order to select a reference photo, the photographed photo selecting menu 803 provides thumbnails of consecutively taken photos. In particular, the consecutively taken photos may include the photos used for a previously created moving image. If one of the photos is selected, the controller 180 can output the selected photo to the preview region 1302.

The reference photo output region 1301 is providing the thumbnail of the photo set as a reference photo of a currently edited moving image.

The preview region 1302 is providing a preview of the photo selected from the photographed photo selecting menu 803. If a prescribed touch gesture is applied to a preview screen, the controller 180 of one embodiment of the present invention can set a currently outputted photo as a reference photo. For instance, if a long touch gesture is inputted to the preview screen, the currently outputted photo can be set as the reference photo. If so, the thumbnail outputted to the reference photo output region 1301 can be replaced by the new reference photo.

The save object 1303 is the object for saving the changed settings and creating a new moving image. In response to a touch input to the save object 1303, the controller 180 creates a new moving image corresponding to the changed settings.

FIG. 13 (b) shows one example of a detailed state for changing photos used in creating a moving image.

According to one embodiment of the present invention, the photographed photo selecting menu 803 can output a check box 803-1. The mobile terminal 100 outputs the photographed photo selecting menu 803 and then receives 'select' or 'cancel' of a desired photo from a user. The check and release of the outputted check box 803-1 can be alternately performed in response to touch inputs onto the check box 803-1.

In response to an input of a touch to the save object 1303, the controller 180 creates a new moving image based on the photos, each of which check box 803-1 is checked.

Accordingly, embodiments of the present invention provide various effects and/or features.

According to at least one of embodiments of the present invention, a moving image is created using a plurality of consecutively photographed images and audio data is played back together with audio data recorded in the corresponding photographing. Therefore, the present invention provides a user with the image full of movement and sensibilities on the photographing.

According to at least one of embodiments of the present invention, in a method of creating a moving image, a changeable region and an unchangeable region in a plurality of consecutively taken photos are discriminatively analyzed, whereby the moving image can be created with low capacity. In particular, the present invention can provide an image full of movement using data having a size smaller than that of a video and stimulate sensibility different from that of the video.

It will be appreciated by those skilled in the art that the present invention can be specified into other form(s) without departing from the spirit or scope of the inventions.

The above-described methods can be implemented in a program recorded medium as computer-readable codes. The computer-readable media may include all kinds of recording devices in which data readable by a computer system are stored. The computer-readable media may include ROM, RAM, CD-ROM, magnetic tapes, floppy discs, optical data storage devices, and the like for example and also include carrier-wave type implementations (e.g., transmission via Internet). Further, the computer may include the controller 180 of the terminal.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
   a display configured to display at least one image;
   a camera; and
   a controller configured to:
      control the camera to photograph a plurality of images,
      display at least one candidate indicator indicating an unchangeable region and at least one changeable region in the plurality of the photographed images based on variations from among a plurality of the photographed images, wherein the changeable region being a region of the images having a variation greater than a reference value, and
      receive a selection input selecting a changeable region from among the at least one changeable region indicated by the at least one candidate indicator, and
      provide a moving image by combining an unchangeable region with the selected changeable region in the plurality of the photographed images, wherein the unchangeable region being a region of the images having a variation equal to or less than a reference value.

2. The mobile terminal of claim 1, wherein the moving image displays the variations at the changeable region by displaying the changeable region of each of the plurality of the photographed images in an order of time.

3. The mobile terminal of claim 1, wherein the controller to control the display to display a prescribed one of the plurality of the photographed images, and wherein the controller to further control the display to display the indicator to identify the changeable region.

4. The mobile terminal of claim 1, wherein the controller to determine whether the changeable region repeats a specific variation, and wherein when the changeable region repeats the specific variation, the controller to exclude the repeated variation from combining the changeable regions.

5. The mobile terminal of claim 1, further comprising a microphone, wherein the controller to combine audio data inputted through the microphone with the moving image.

6. The mobile terminal of claim 5, further comprising a user input unit, and wherein the controller to apply noise reduction to the audio data based on audio sensitivity that is adjusted by the user input unit.

7. The mobile terminal of claim 1, further comprising a sensing device to sense a motion of the camera, wherein when the motion is sensed by the sensing device, the controller to output an indication for warning of the sensed motion of the camera.

8. The mobile terminal of claim 7, wherein the controller to control the display to display an indicator to indicate a strength of the motion sensed by the sensing device.

9. The mobile terminal of claim 1, further comprising a user input unit, wherein the plurality of the photographed images include images photographed in a time period between a prescribed time before a timing point of receiving an input, by the user input unit, of a request for a photographing and the timing point of receiving the input.

10. The mobile terminal of claim 1, further comprising a user input unit to adjust the reference value.

11. A method of a mobile terminal, comprising:
   receiving a plurality of photographed images;
   displaying at least one candidate indicator indicating at least one changeable region in each of the plurality of the photographed images based on variations from among the plurality of the photographed images, wherein the changeable region being a region of the images having a variation greater than a reference value;
   receiving a selection input selecting a changeable region from among the at least one changeable region indicated by the at least one candidate indicator; and
   providing a moving image by combining an unchangeable region with the selected changeable region in the plurality of the photographed images, wherein the unchangeable region being a region of the images having a variation equal to or less than a reference value.

12. The method of claim 11, wherein the moving image displays the variation at the changeable region of each of the plurality of the photographed images in an order of time.

13. The method of claim 11, wherein the indicator, on a display, to identify the changeable region in one of a plurality of the photographed images displayed on the display.

14. The method of claim 11, further comprising combining audio data with the moving image, and outputting the combined audio data with the moving image.

15. The method of claim 14, further comprising applying noise reduction to the audio data based on audio sensitivity that is adjusted by a user input unit.

16. The method of claim 11, further comprising outputting an indication for warning of a motion of the camera determined by a sensing device.

17. A terminal comprising:
   a display to display at least one image;
   a camera to receive a plurality of images; and
   a controller to determine an unchangeable region of the plurality of images and to determine a changeable region of the plurality of images based on at least one variation of the plurality of images, the unchangeable region being a region having a variation equal to or less than a reference value, and the changeable region being a region in at least two of the plurality of images having a variation greater than the reference value, and the controller to provide a moving image that includes the unchangeable region and the changeable region of the at least two of the plurality of images.

18. The terminal of claim 17, wherein the moving image displays the variation at the changeable region by displaying the changeable region of each of the plurality of images in an order of time.

19. The terminal of claim 17, wherein the controller to control the display to display a prescribed one of the plurality of images, and wherein the controller to further control the display to display an indicator to identify the changeable region of the displayed one of the plurality of images.

20. The terminal of claim 17, wherein when there are a plurality of changeable regions in one of the plurality of images, the controller to receive a selection of at least one of the plurality of the changeable regions and to provide the moving image by using the selected one of the changeable regions.

21. The terminal of claim 17, further comprising a microphone, wherein the controller to combine audio data inputted through the microphone with the moving image.

22. The terminal of claim 21, further comprising a user input unit, and wherein the controller to apply noise reduction to the audio data based on audio sensitivity that is adjusted by the user input unit.

23. The terminal of claim 17, further comprising a sensing device to sense a motion of the camera, wherein when the motion is sensed by the sensing device, the controller to output an indication for warning of the sensed motion of the camera.

24. The terminal of claim 23, wherein the controller to control the display to display an indicator to indicate a strength of the motion sensed by the sensing device.

* * * * *